US006372842B1

(12) United States Patent
Grisso et al.

(10) Patent No.: US 6,372,842 B1
(45) Date of Patent: Apr. 16, 2002

(54) METHODS OF USING AN AQUEOUS COMPOSITION CONTAINING A WATER-SOLUBLE OR WATER-DISPERSIBLE SYNTHETIC POLYMER AND RESULTANT COMPOSITIONS FORMED THEREOF

(75) Inventors: Bryan A. Grisso, Wickliffe; Robert E. Quinn, Cleveland; Sanjay N. Kalhan, Richmond Heights; Edward J. Konzman, Eastlake; Saurabh S. Lawate, Concord; James H. Bush, Mentor; Joseph W. Pialet, Euclid; Paul Walsh; Carlos A. Piedrahita, both of Mentor, all of OH (US); Philip R. Miller, Simpsonville, SC (US); Alan C. Clark, Mentor, OH (US); David L. Facchiano, Concord, OH (US); Al E. Haas, Mentor, OH (US); Clifford Kowall, South Euclid, OH (US); Richard A. Denis, Auburn Township, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/333,154

(22) Filed: Jun. 14, 1999

Related U.S. Application Data

(60) Provisional application No. 60/089,349, filed on Jun. 15, 1998.

(51) Int. Cl.[7] .......................... C08L 41/00
(52) U.S. Cl. .......................... 524/547; 524/521
(58) Field of Search .......................... 524/804, 521, 524/547

(56) References Cited

U.S. PATENT DOCUMENTS

| | | | | | |
|---|---|---|---|---|---|
| 3,989,633 | A | * | 11/1976 | Frisque | 252/11 |
| 4,240,940 | A | * | 12/1980 | Vasishth | 260/22 |
| 4,450,253 | A | * | 5/1984 | Suk | 524/378 |
| 4,482,662 | A | * | 11/1984 | Rapaport | 523/504 |
| 4,489,180 | A | * | 12/1984 | Lundberg | 523/175 |
| 4,518,734 | A | * | 5/1985 | Brouillette | 524/378 |
| 4,547,540 | A | * | 10/1985 | Yeoman | 524/130 |
| 4,737,541 | A | | 4/1988 | Stavenger et al. | 524/57 |
| 4,767,556 | A | | 8/1988 | Childers et al. | 252/8.6 |
| 4,808,215 | A | | 2/1989 | Gill et al. | 71/105 |
| 4,919,828 | A | | 4/1990 | Childers | 252/8.75 |
| 5,114,481 | A | * | 5/1992 | Lynch | 106/170 |
| 5,196,459 | A | * | 3/1993 | Smrt | 523/502 |
| 5,215,582 | A | * | 6/1993 | Bolt | 106/499 |
| 5,219,476 | A | * | 6/1993 | Lockhart | 252/8.551 |
| 5,250,599 | A | * | 10/1993 | Swartz | 524/366 |
| 5,451,627 | A | * | 9/1995 | Jamasbi | 524/389 |
| 5,468,353 | A | | 11/1995 | Anich et al. | 204/105 R |
| 5,490,943 | A | | 2/1996 | Eicken et al. | 252/8.6 |
| 5,587,145 | A | | 12/1996 | Lion et al. | 424/45 |
| 5,620,684 | A | | 4/1997 | Dupuis | 424/70.12 |
| 5,688,514 | A | | 11/1997 | Svoboda | 424/401 |
| 5,798,324 | A | | 8/1998 | Svoboda | 510/182 |
| 5,804,202 | A | | 9/1998 | Chaudhry et al. | 424/401 |
| 5,814,683 | A | | 9/1998 | Branham | 523/161 |
| 5,843,881 | A | | 12/1998 | Dubois et al. | |
| 5,863,527 | A | | 1/1999 | Hutchins et al. | 424/70.16 |
| 6,040,406 | A | * | 3/2000 | Carrier | 526/238.22 |
| 6,146,495 | A | * | 11/2000 | Duggirala | 162/48 |

FOREIGN PATENT DOCUMENTS

| | | | |
|---|---|---|---|
| EP | 0 361 592 | 4/1990 | 11/173 |
| EP | 0 750 899 | 1/1997 | |
| EP | 0 811 677 | 12/1997 | 173/2 |

* cited by examiner

*Primary Examiner*—Paul R. Michl
(74) *Attorney, Agent, or Firm*—David M. Shold; Michael F. Esposito

(57) ABSTRACT

The present invention relates to methods of using an aqueous composition or dispersion containing a water-soluble or water-dispersible synthetic polymer, and compositions formed thereof. The aqueous composition or dispersion is added to agricultural spray compositions, ink compositions, deicing or anti-icing compositions, latex paint and coating compositions, cleaner compositions, adhesives, fire-extinguishing chemical compositions, hydro-metallurgy/electro-winning compositions, compositions having organosilanes, personal care compositions, water-based hydraulic compositions, dust control compositions, and textile finish compositions, to impart properties including aerosol control, spatter control, shear stability, rheology control, transfer efficiency, oil/water reduction, sling control, emollient performance, film forming capability, surface activity, encapsulent ability, lubricity, thickening, and anti-wear capability, to the resultant composition formed thereof.

24 Claims, No Drawings

METHODS OF USING AN AQUEOUS COMPOSITION CONTAINING A WATER-SOLUBLE OR WATER-DISPERSIBLE SYNTHETIC POLYMER AND RESULTANT COMPOSITIONS FORMED THEREOF

RELATED APPLICATIONS

This application is the converted, non-provisional application of provisional application Ser. No. 60/089,349 filed on Jun. 15, 1998, incorporated herein by reference in its entirety.

TECHNICAL FIELD

The present invention relates to methods of using an aqueous composition or dispersion containing a water-soluble or water-dispersible synthetic polymer, and resultant compositions formed thereof.

BACKGROUND OF THE INVENTION

The present invention relates to methods of using an aqueous composition or dispersion containing a water-soluble or water-dispersible synthetic polymer, and to the resultant compositions formed thereof. When added to a particular composition, the aqueous composition or dispersion imparts desirable properties to the resultant composition or material.

A variety of compositions or materials are needful of certain properties to obtain a desirable end product.

For example, agricultural spray compositions are in need of aerosol control and drift control in combination with shear stability during spraying operations to contain the agricultural spray composition within a selected target area. Drift control is the ability to eliminate undesired fluid deposition outside a target area. Aerosol control is the ability to alter the size distribution of particles of a composition or material.

Shear stability of the composition is needed under spraying conditions due to the shear stress the composition undergoes under spraying conditions at the discharge point at the nozzle and also the shear input experienced at the pump.

That is, a composition sprayed from a sprayer undergoes shear stress. Under these conditions, the composition is released in the form of droplets. Often the droplets are small enough to be classified as a mist or an aerosol. Misting, or the formation of a mist, is considered undesirable, because it represents a loss of fluid. Also, the mist or aerosol created is considered a contaminant in the surrounding air. For example, an aerosol, upon discharge from a sprayer, can disperse beyond a selected target area, and can therefore contaminate crops or harm persons in a vicinity located beyond the selected target area. Therefore, it is very beneficial to impart aerosol control or mist control properties to such compositions to prevent these undesirable effects created by misting.

Also, materials undergo certain conditions resulting in the creation of particles that suspend in the air. These particles can be classified as particulates. The suspension of particulates in air is considered a health hazard. For example, particulates generated from coal during coal mining can disperse into the air and contaminate the surrounding air. Therefore, it is very beneficial to impart particulate control to such materials to reduce, if not prevent, particulate suspension in air. The phrase "particulate control" as used throughout this specification refers to the ability to reduce or prevent particulate suspension in air by utilizing the aqueous composition or dispersion containing the polymer of the present invention.

Ink compositions are needful of aerosol control, shear stability, spatter control, rheology control, and improved transfer capability properties.

Deicing or anti-icing compositions are also needful of aerosol control, shear stability, and rheology control.

Hydro-metallurgy/electro-winning compositions are needful of aerosol control, rheology control, and surfactancy.

Cleaner compositions, such as household or industrial cleaner compositions, are needful of aerosol control, rheology control, improved transfer capability, and surfactancy (surface activity).

Adhesive compositions are needful of aerosol control, shear stability, rheology control, and improved transfer capability.

Fire-extinguishing chemical compositions are needful of drag reduction, aerosol control, shear stability, rheology control, and surface activity.

Compositions having organosilanes are needful of aerosol control, shear stability, encapsulent capability, surface activity, and transfer efficiency.

Personal care product compositions, including hand lotions, body creams, soaps, suntan lotions, hair conditioners, aftershave lotions, lip balms, cold creams, bubble bath, and cleansing lotions are needful of rheology control, oil/water reduction, emollient performance, thickening, film forming capability, and surfactancy. Hairspray, deodorant, and perfume are needful of aerosol control and transfer efficiency.

Textile finish compositions, such as textile knitting fluid compositions or fiber finishing formulations, are needful of shear stability, sling control, lubricity, anti-wear properties, oil/water reduction, and surfactancy.

Water-based hydraulic fluids are needful of shear stability, rheology control, lubricity, and anti-wear properties.

Latex and other waterborne compositions are needful of rheology control, aerosol control, and adhesion. Latex coating compositions are needful of transfer efficiency.

Dust control during mining operations is desirable, and therefore particulate control during such operations is desirable.

SUMMARY OF THE INVENTION

The present invention provides methods of using an aqueous composition or dispersion containing a water-soluble or water-dispersible synthetic polymer, wherein said aqueous composition or dispersion imparts aerosol control in combination with shear stability to a resultant composition, whereby the resultant composition sustains a shear rate range of from about 1 to about 1,000,000 $s^{-1}$, and sustains a shear stress range of from about 1 pascal to about 500,000 pascals. The aqueous composition or dispersion imparts desirable properties, including aerosol control in combination with shear stability, or particulate control, to the resultant compositions or material, and provides resultant compositions or material having certain desirable properties.

When shear stability is a property to be imparted according to the present invention, shear rate and shear stress under spraying conditions are factors in determining performance of a composition regarding shear stability.

The shear rate that a composition is typically subjected to at the discharge point of the nozzle or at the pump can be as low as zero to as high as $10^6$ reciprocal seconds, i.e., from 0 to $10^6$ $s^{-1}$. Low shear is from 1,000 to 99,000 $s^{-1}$. High shear is greater than 99,000 $s^{-1}$. In terms of shear stress, the shear stress that a composition is typically subjected to at the nozzle or at the pump can be from 1 pascal to 30,000 pascals.

When the aqueous composition or dispersion containing the polymer according to the present invention is added to a composition to form a resultant composition, the resultant composition has a shear stability such that it can sustain a shear rate range of from about 1 to about 1,000,000 $s^{-1}$, and can sustain a shear stress range of from about 1 pascal to about 500,000 pascals.

Alternatively, when the aqueous composition or dispersion containing the polymer according to the present invention is added to a material, particulate suspension is reduced or eliminated.

Also, when the aqueous composition or dispersion containing the polymer according to the present invention is added to a composition, it can function as a thickener for the composition.

The aqueous composition or dispersion is added to agricultural spray compositions, ink compositions, deicing or anti-icing compositions, hydro-metallurgy/electro-winning compositions, household cleaner compositions, adhesives, fire-extinguishing chemical compositions, compositions having organosi lanes, personal care product compositions, water-based hydraulic compositions, latex paint and coating compositions, and textile finish compositions. The aqueous composition or dispersion is also used to aid in particulate control, for example, during mining operations or similar activity.

The present invention provides for the ability to impart properties including one or more of the following properties: aerosol control in combination with shear stability, particulate control, spatter control, rheology control, transfer efficiency, oil/water reduction, sling control, emollient performance, film forming capability, surface activity, encapsulent ability, lubricity, thickening, and anti-wear capability, to the above-mentioned compositions and materials.

In a preferred embodiment, the aqueous composition or dispersion according to the present invention and as utilized in the resultant compositions or materials according to the present invention, comprises a polymer that is a copolymer formed by copolymerizing (A) a hydrophobic monomer selected from the group consisting of A(I) an alkyl substituted aerylamide compound having the formula:

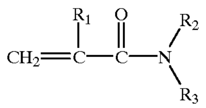

wherein $R_1$ is a hydrogen or a methyl group and $R_2$ and $R_3$ are independently hydrogen or hydrocarbyl groups, provided that the total number of carbon atoms in is $R_2$ and $R_3$ combined is between 2 and 36, and A(II) an acrylate ester of the following formula:

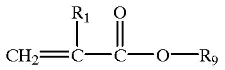

where $R_1$ is a hydrogen or a methyl group and $R_9$ is a hydrocarbyl group containing between 1 and 20 carbon atoms; and (B) a hydrophilic monomer selected from the group consisting of:

B(I) acrylamido sulfonic acids having the formula:

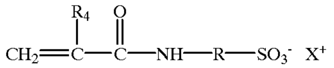

wherein $R_4$ is a hydrogen or a methyl group and R is an aliphatic or aromatic hydrocarbon group containing from 2 to 12 carbon atoms, preferably from 2 to 8 carbon atoms;

B(II) acrylamido disulfonic acids having the formula:

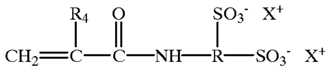

wherein $R_4$ is a hydrogen or a methyl group and R is an aliphatic or aromatic hydrocarbon group containing from 2 to 12 carbon atoms, preferably from 2 to 8 carbon atoms, and B(III) a styrene sulfonic acid having the formula:

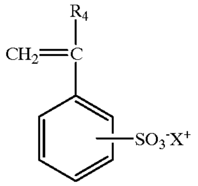

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

$R_5R_6R_7R_8N^+$ wherein $R_5$ $R_6$ $R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99. The ratio of moles of A to B for A(I) or for A(II) will vary within these ranges according to the particular method of use and resultant composition selected.

In another embodiment, the polymer in the aqueous composition or dispersion according to the present invention and as utilized in the resultant compositions of the present invention, can optionally further comprise a third monomer unit, (C). The polymer is prepared by polymerization of the combination of (A), (B), and (C) monomer units. Unit (C) must be polymerizable with units (A) and (B).

DETAILED DESCRIPTION OF THE INVENTION

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and acylic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmer-capto, nitro, nitroso, sulfoxy, etc.); and (3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazole, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. In that case, the hydrocarbyl group is purely hydrocarbon.

The term "hydrophilic" is used herein consistent with its standard meaning of having affinity for water, whereas "hydrophobic" is used herein consistent with its standard meaning of lacking affinity for water.

The term "water-soluble or water-dispersible synthetic polymer" encompasses a polymer, or mixtures of polymers, capable of imparting, to a composition, a shear stability such that the composition can sustain a shear rate range of from about 1 to about 1,000,000 $s^{-1}$, and can sustain a shear stress range of from about 1 pascal to about 500,000 pascals.

The word "sustain" or "sustains" as used throughout this specification means that the compositions of the present invention have the ability to survive a shear rate range of from about 1 to about 1,000,000 $s^{-1}$ and a shear stress range of from about 1 pascal to about 500,000 pascals over a period of time beginning at a point before the composition is discharged and ending at the moment the composition is discharged. The word "survive" means the composition maintains its mist control properties from the point before discharge to the point after discharge such that effective mist control is achieved. The phrase "effective mist control" means that about 10% to about 100% mist reduction is achieved by the composition during and after discharge.

The polymers suitable for the present invention have a weight average molecular weight of generally greater than about 200,000, and preferably greater than about 500,000. The phrase "weight average molecular weight" is given the well known meaning in the art, and is defined numerically as:

Mw=(sum over all polymer molecules ((number of molecules of a given mass)(that mass^2)))/(sum over all polymer molecules ((number of molecules of a given mass)(that mass))), OR as:

$$M_w = \frac{\sum_{i=1}^{\infty} N_i M_i^2}{\sum_{i=1}^{\infty} N_i M_i}$$

The weight average molecular weight is a weighted average, which favors the high molecular weight molecules. The value is well known and fundamental in the art. It is measured using well known methods in the art, such as light scattering technique, GPC analysis, and the like.

The Hydrophilic Monomers

The hydrophilic monomers usable in the present invention are ethylenic monomers containing a sulfonate group. Three types of sulfonate monomers have been found to be useful in the present invention.

The first type of hydrophilic monomers are the substituted acrylamides containing a sulfonate group:

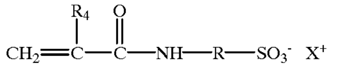

wherein $R_4$ is a hydrogen or a methyl group, and R is an aliphatic or an aromatic hydrocarbon group containing from 2 to 12 carbon atoms, more preferably from 2 to 8 carbon atoms, which acts as a bridge between the nitrogen portion of the acrylamido group and the sulfonate group.

The R group may be branched, as in the molecule 2-acrylamido-2-methylpropane sulfonic acid, which has the following structure:

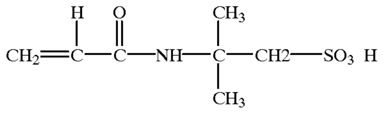

The R group may also include phenyl groups, alkyl substituted phenyl group and cycloaliphatic groups.

The second type of sulfonate monomer are the substituted acrylamides containing two sulfonate group structures:

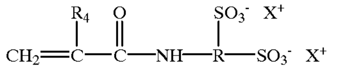

wherein $R_4$ is a hydrogen or a methyl group and R is as defined above for the acrylamides with a single sulfonate group. The sulfonate groups may be attached to the same or different carbon atoms.

The third type of sulfonate monomer is the styrene sulfonate illustrated by the following formula:

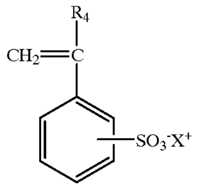

wherein $R_4$ is a H or a methyl group; and $X^+$ is a H or a cation selected from the group consisting of alkali metal cations, alkaline earth cations, cations of the following transition metals: Sc, Ti, V, Cr, Mn, Fe, Co, Ni, Cu, Zn, and ammonium cations of the following formula:

$R_5R_6R_7R_8N^+$ wherein $R_5$, $R_6$, $R_7$, and $R_8$ are independently hydrogen or hydrocarbyl groups, provided that the total number of carbon atoms in an ammonium cation does not exceed 21 carbon atoms.

The Hydrophobic Monomers

The hydrophobic monomer may be an acrylamide or methacrylamide

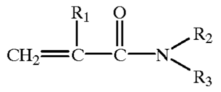

In this formula, $R_1$ may either be a hydrogen or a methyl group corresponding to an acrylamide or a methacrylamide respectively, and $R_2$ and $R_3$ are independently a hydrogen or hydrocarbyl group provided that the total number of carbons in $R_2$ and $R_3$ is in the range of 2 to 36 carbon atoms. Accordingly, when $R_2$ is a methyl group, then $R_3$ must be an alkyl group rather than a hydrogen. It is preferred that the total number of carbon atoms in $R_2$ and $R_3$ be in the range of 4 to 36 carbon atoms, or 4 to 24 carbon atoms, or 4 to 12 carbon atoms. Other preferred ranges for the total number of carbon atoms in $R_2$ and $R_3$ are 8 to 36 carbon atoms, or 8 to 24 carbon atoms, or 8 to 12 carbon atoms, or 4 to 8 carbon atoms.

The hydrophobic monomer may also be an acrylate or methacrylate ester of the formula:

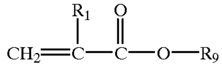

where $R_1$ is a hydrogen or a methyl group and $R_9$ is a hydrocarbyl group containing between 1 and 20 carbon atoms. It is preferred that $R_9$ contain between 2 to 18 carbon atoms, 4 to 18 carbon atoms, 4 to 12, 4 to 8 carbon atoms, 8 to 20 carbon atoms, 8 to 16 carbon atoms, or 8 to 12 carbon atoms.

Component (C), an Additional Monomer Unit

The polymers of the present invention are prepared by the polymerization combination of (A) and (B) monomers, and optionally (C) monomers may be incorporated into the polymerization reaction, to form the acrylamide polymer of the present invention. The polymers of the present invention can comprise from about 0% to about 50%, preferably from about 5% to about 40%, and more preferably from about 15% to about 30%, by weight of the polymer having (C) monomer units.

The (C) monomer units are copolymerizable with the (A) and (B) monomer units. Either a single type of (C) unit or combinations or two or more (C) units can be utilized. The (C) units are selected to meet the requirements of the polymer of the present invention.

The word "copolymerizable", as used herein, means that the (C) monomers can be reacted with or polymerized with the (A) and (B) monomers in a polymerization reaction using one or more conventional synthetic techniques.

The (C) monomers can be synthesized utilizing a variety of standard synthetic procedures familiar to the polymer chemist of ordinary skill in the art. Furthermore, these monomers can be synthesized starting from commercially available polymers.

Specifically, component (C) is a vinyl monomer. Preferably, component (C) is an acrylic acid monomer or an acrylamide monomer, or mixtures thereof.

As used herein the term "acrylic monomer" includes acrylic acids, esters of acrylic acids, amine or metal salts of acrylic acids, acrylic amides, and acrylonitriles and the corresponding alkacryl-, especially methacryl-, compounds. The esters of acrylic acids typically contain from about 2 to about 50 carbon atoms in the ester group, which ester group includes the carbonyl carbon atom. Often, the ester groups are lower alkyl esters wherein the expression "lower alkyl" means alkyl groups having fewer than 8 carbon atoms, preferably from 1 to about 4 carbon atoms.

Examples of useful acrylic monomers include acrylic acid, sodium acrylate, methacrylic acid, esters thereof, including lower alkyl esters, fatty esters, and mixed esters, such as C8–10 alkyl esters and C12–15 esters, acrylamide, methacrylamide, and N- and N,N-substituted acrylamides and the corresponding methacrylamides, acrylonitrile and methacrylonitrile.

Also included among "acrylic" monomers are α, β-unsaturated polycarboxylic monomers such as maleic, esters thereof, amides, amide acids and esters thereof, and the corresponding fumaric compounds.

The term "vinyl monomer" includes vinyl esters, N-vinyl amides, and vinyl substituted aromatics. Examples of useful vinyl monomers include vinyl acetate, N-Vinyl-2-Pyrrolidinone, N-Vinyl Caprolactam, 4-Vinyl Pyridine, and styrene.

The Polymer

The aqueous composition utilized in the methods of using according to the present invention and in the resultant compositions of the present invention, contain a polymer, or mixtures of polymers, formed by the polymerization of the aforementioned hydrophilic monomer and the aforementioned hydrophobic monomer, and optionally, the (C) monomer unit.

In a preferred embodiment, the polymer is a copolymer formed by the copolymerization of the aforementioned hydrophilic monomer and the aforementioned hydrophobic monomer.

As mentioned earlier, the hydrophobic monomers include alkyl substituted acrylamides, alkyl substituted methacrylamides, acrylate esters, and methacrylate esters, and the hydrophilic monomers include sulfonate molecules containing a single ethylenic linkage.

When the polymer contains alkyl substituted acrylamides and alkyl substituted methacrylamides as the hydrophobic monomer, then the molar percentage of the hydrophobic monomer is in the range of from about 1 to about 95 percent. In this case, the molar percentage of the hydrophilic monomer is in the range of from about 5 to about 99 percent. The molar percentage of the hydrophilic and hydrophobic monomer will vary within their respective range according to the particular application, i.e., according to the selected method of use and resultant composition.

When the polymer contains alkyl substituted acrylates and alkyl substituted methacrylates as the hydrophobic monomer, then the molar percentage of hydrophobic monomer is in the range of from about 1 to about 75 molar percent, and the molar percentage of the hydrophilic monomer is in the range of from about 25 to about 99 percent. The molar percentage of the hydrophilic and hydrophobic monomer will vary within their respective range according to the particular application, i.e., according to the selected method of use and resultant composition.

In the polymerization reaction, the ethylenic linkages polymerize and the resulting polymer consists of a polyethylene backbone with hydrophilic and hydrophobic side chains.

Formation of the Polymer

The polymer is produced by free radical polymerization. The polymerization is done by well-known free radical methods. The general properties of acrylamide polymers, as well as their methods of preparation are discussed in The Encyclopedia of Polymer Science and Engineering, Volume 1, John Wiley & Sons, 1985 (pp 169–211). The Encyclopedia discusses techniques useful in forming acrylic ester polymers (pp 265–273).

The polymerization may be conducted in solution, and by various suspension or emulsion methods. In solution polymerization, a solvent is selected which allows both the hydrophilic and hydrophobic monomers to be maintained in solution. Mixtures of water, acetic acid, various molecular weight alcohols such as, methanol, ethanol and butyl alcohol, as well as polar solvents such as acetone, acetic acid, tetrahydrofuran, dimethyl sulfoxide, dioxane, dimethyl formamide and N-methylpyrrolidinone.

A wide variety of free radical sources may be used as initiators including persulfates, redox couples, azo compounds, peroxides, and the like. In particular, emulsion polymerization methods may be used to form polymers useful in the present invention.

Measurements of solution viscosity were made by comparing the efflux time t required for a specified volume of copolymer solution to flow through a capillary tube (Ostwald-Fenske capillary viscometer) with the corresponding efflux time to of the solvent. From t, to and the copolymer concentration c, the inherent viscosity is derived based on the following equation:

$$h_{inh}=[\ln(t/t_o)]/c$$

where the concentration c is expressed in grams per deciliter (g/dl). Methanol was used as solvent. All inherent viscosities were measured at 30° C. and c=1.0 g/dl.

The inherent viscosity range of the polymer according to the present invention is from about 0.5 to about 7.0. The inherent viscosity will vary within this range depending upon the particular application, that is, depending upon the selected method of use and resultant composition.

The preferred method of polymerization is solution polymerization under temperatures of from about 20° C. to about 80° C., using from about 20 to about 80 percent monomers and from about 20 to about 80 percent solvent. The following examples illustrate solution polymerization. However, bulk polymerization can also be utilized.

EXAMPLE 1

A 200 ml resin flask was charged with 40 grams (0.101 moles) of 2-acrylamido-2-methylpropanesulfonic acid sodium salt aqueous solution (58% monomer, 42% $H_2O$), 4.3 g (0.033 moles) of t-butylacrylamide (t-BAA), 0.014 g (0.00016 mol) of sodium bicarbonate ($NaHCO_3$) and 20 g of MeOH. A nitrogen purge at 0.1 SCFH was begun and the mixture was heated to 70° C. with stirring In a separate beaker 0.014 g. (0.00006 mol) of sodium persulfate ($Na_2S_2O_8$) was dissolved in 3 g of $H_2O$. This solution was taken up in a 20 ml syringe. The syringe was placed on a syringe pump which was set to deliver 0.07 ml/minute.

The $Na_2S_2O_8$ solution was added, via the syringe pump, to the resin flask over a 45 minute period. The two monomers combined made up 42.7% of the total mixture. Thirty minutes after addition was complete, 20 ml of $H_2O$ and 45 ml of MeOH were added and the mixture was stirred at 70° C. for three hours. The contents of the flask were poured into a crystallizing dish and dried at 80° C. for 20 hours to yield 27.5 g. (100%) of product containing 11.3% sulfur and 6.4% nitrogen and had an inherent viscosity of 2.28 dl/g at 30° C. in MeOH.

Additional Examples 2, 3, 4, 5, 6, and 7 were prepared using the same method as used in Example 1, but different proportions of the monomers. The results are set forth in Table 1.

TABLE 1

| | Hydrophobic/Hydrophilic Monomer Molar Ratio | | | | | Copolymer Product | | | |
|---|---|---|---|---|---|---|---|---|---|
| | | | | | | Initial | | | Inherent |
| Ex. | hydrophobic* | hydrophilic** | % solids | $NaHCO_3$ (mole %) | $Na_2S_2O_8$ (mole %) | MeOH (ml) | % Sulfur | % Nitrogen | Vis*** dl/g |
| 1 | 25 | 75 | 42.7 | 0.12 | 0.04 | 20 | 11.3 | 6.4 | 2.28 |
| 2 | 90 | 10 | 28.8 | 0.060 | 0.02 | 75 | 2.5 | 9.9 | 1.89 |
| 3 | 75 | 25 | 41 | 0.096 | 0.03 | 40 | 5.0 | 8.7 | 2.46 |
| 4 | 85 | 15 | 28 | 0.063 | 0.02 | 100 | 3.2 | 9.5 | 1.69 |
| 5 | 80 | 20 | 45 | 0.05 | 0.02 | 40 | 4.4 | 9.2 | 2.78 |
| 6 | 50 | 50 | 36 | 0.075 | 0.025 | 50 | 8.9 | 6.7 | 2.14 |
| 7 | 95 | 5 | 42 | 0.25 | 0.1 | 32 | 1.1 | 9.8 | 2.08 |

*Hydrophobic monomer = t-Butyl acrylamide
**Hydrophilic monomer = 2-Acrylamido-2-methylpropane sulfonic acid Na salt
***Inherent Viscosity at 30° C. in Methanol

EXAMPLE 8

A 200 ml resin flask was charged with 59g (0.15 moles) of 2-acrylamido-2-methylpropane sulfonic acid Na salt aqueous solution, referred to as NaAMPS, (58% monomer, 42% $H_2O$), 19.2 g (0.15 moles) of t-butylacrylate and 45 g. of MeOH. The mixture was stirred until homogeneous and then heated to 70° C. with a $N_2$ purge at 0.3 SCFM.

In a separate beaker 0.021 g (0.00009 mol) of $Na_2S_2O_8$ was dissolved in 2 g $H_2O$ and 1 g MeOH and the solution was taken up in a 20 ml syringe. The syringe was placed on a syringe pump which was set to deliver at 0.07 ml/min.

The initiator was added to the resin flask over approximately 45 minutes. After the addition was complete the solution was stirred for an additional 4 hours at 70° C. The contents of the flask were then poured into a crystallizing dish and dried at 90° C. overnight, to yield a product with 3.0% nitrogen, 6.5% sulfur and with an inherent viscosity of 2.1 dl/g at 30° C. in MeOH.

Additional examples 9 and 10 were prepared using similar conditions employed in Example 8, but with either different monomer molar ratios or with different monomer concentration levels. The results are set forth in Table 2.

TABLE 2

Examples 8–10

| | Hydrophobic/Hydrophilic Monomer Molar Ratio | | | | | Copolymer Product | | |
|---|---|---|---|---|---|---|---|---|
| Ex. | Hydro-phobic* | hydro-philic** | % solids | $Na_2S_2O_8$ (mole %) | Initial MeOH (ml) | % Sulfur | % Nitrogen | Inherent Vis*** dl/g |
| 8 | 50 | 50 | 26 | .06 | 100 | 6.3 | 3.7 | 1.1 |
| 9 | 50 | 50 | 43.1 | .03 | 45 | 6.5 | 3.0 | 2.1 |
| 10 | 65 | 35 | 39.7 | .03 | 50 | 4.8 | 2.9 | 1.8 |

*Hydrophobic monomer = t-Butyl acrylate
**Hydrophilic monomer = 2-Acrylamido-2-methylpropane sulfonic acid Na salt
***Inherent Viscosity at 30° C. in Methanol

EXAMPLE 11

Example of a Terpolymer Polymerization Reaction

A 500 ml resin flask was charged with 20.0 g (0.157 moles) of tert-butylacrylamide, 41.0 g (0.104 moles) of 2-acrylamido-2-methylpropane sulfonic acid sodium salt, 18.6 g (0.262 moles) of acrylamide, 0.045 g EDTA, and 700 g of deionized water.

The reaction mixture was stirred with a mechanical stirred at 570 rpm and the contents were heated to 70° C. $N_2$ gas flow was blown subsurface at a rate of 0.5 scfh. The reaction was stirred at 70° C. for 0.5 hr before 0.0025 g (0.015 moles) of azobisisobutyronitrile were added to the reaction mixture and the reaction exothermed to 77° C. The reaction was stirred for 1.5 hr before another increment of 0.0038 g (0.023 mmoles) of azobisisobutyronitrile was added to the mixtule.

After an additional 2 hr of mixing at 77° C., 100 g of water and 0.10 g of sodium meta bisulfite were added to the mixture. The contents were heated to 80° C. and held at this temperature for 1 hr before collecting the product as an aqueous solution.

Testing of the Polymer as a Mist Suppressant

In order to evaluate the performance of the polymer utilized in the compositions and in the methods of use of the present invention, a method was developed for a polymer's ability to reduce mist formation. This method involved pumping the liquid containing a dye and 0.5 weight percent of polymer to be tested through the center tube of a coaxial air blast atomizer. Air, at high pressure flows from the outer tube of the atomizer. The test liquid is atomized and the resulting spray strikes a screen which is placed 38 centimeters from the end of the atomizer. The atomization process continues for a standard period of time after which the screen is dried. The spray emerging from the atomizer strikes the screen in a circular pattern. The size of the pattern depends on the distance of the screen from the atomizer, the liquid flow rate, and the air pressure. These parameters were standardized and were held constant through the measurements described below. It was found that known mist suppressant polymers had a strong influence on the diameter of the pattern produced on the screen. Water, which may be atomized relatively easily into a fine mist, produced the largest diameter pattern. When a known mist suppressant, POLYOX® was added to the water, a large reduction in the pattern diameter was observed. Similarly, samples of the polymers disclosed herein were dissolved in water and found to substantially reduce the diameter of the spray patterns produced on the screen. The samples approximately 350 grams of the test solutions containing each suppressant were subjected to shear for two minutes in a Waring commercial blender Model 700 with a 20,000 RPM rotation speed. The samples were then retested for the effectiveness of the mist suppressant polymer.

The efficiency of mist control was calculated using the following equation:

$$\Delta D = \frac{D_{water} - D_{test\ sample}}{D_{water}}$$

where D is the diameter of the spray pattern.

TABLE 3

Changes in Mist Control Efficiency with Shear

| MATERIAL | % Δ D [Shear = 0 min in blender] | % Δ D [Shear = 2 min in blender] | % loss of mist suppression with shear = 2 min |
|---|---|---|---|
| Water | 0.00 | 0.00 | 0.00 |
| 1 million Mw POLYOX | 20.33 | 6.50 | 68.00 |
| 2 million Mw POLYOX | 39.84 | 2.68 | 93.27 |
| (Ex 3) | 16.67 | 14.23 | 14.63 |
| (Ex 5) | 18.13 | 20.73 | (14.35) gain |
| (Ex 6) | 10.16 | 8.37 | 17.60 |
| (Ex 9) | 17.32 | 8.94 | 48.36 |
| (Ex 10) | 19.11 | 12.20 | 36.17 |

As shown by Table 3, the method of using the copolymer according to the present invention provides for aerosol control under shear stress in the resultant composition. For example, Table 3 shows that the known POLYOX material experiences a loss in aerosol capability as high as 93.27% when subjected to shear for a period of time of 2 minutes. However, according to the present invention, aerosol control capability under shear stress for 2 minutes is reduced at most by only 48.36%, and aerosol control capability actually increases by as much as 14.35% under shear stress for 2 minutes.

Methods of Using and Resultant Compositions Formed Thereof

The methods of using the aqueous composition or dispersion containing the water-soluble or water-dispersible synthetic polymer according to the present invention imparts desirable properties to compositions, and when added to the compositions, forms the following resultant compositions according to the present invention.

In addition to the aqueous composition or dispersion containing the polymer of the present invention, the following resultant compositions may contain additives to improve the properties of the particular resultant composition. These additives are those additives known in the art for the particular resultant composition, in amounts that provide the most desirable effects.

Agricultural Spray Composition

The aqueous composition is added to agricultural spray compositions containing a pesticide or herbicide, to impart drift control, shear stability, encapsulant capability, and surfactancy to the agricultural spray composition.

The resultant agricultural spray composition comprises an active ingredient and the aqueous composition containing a copolymer of a hydrophobic and hydrophilic monomer according to the present invention, and has drift control capability, shear stability, encapsulent capability, and surfactancy.

Testing of the Agricultural Spray Composition

An atomization study was conducted to measure the droplet size spectra produced by spraying various samples of compositions of the present invention through various agricultural sprays nozzles. Most of the tests were conducted using flat fan and deflector nozzles.

The test substances were spray compositions containing the water-soluble or water-dispersible synthetic polymer of the present invention, and are identified as “X” and “Y” in Tables 4, 5, and 6.

The emission droplet size spectra were measured using a laser diffraction particle size analyzer. The measurements were replicated three times. Data were expressed as the entire droplet size spectra, and compared using the following specific parameters: $D_{v0.5}$ (volume median diameter), and the spray volume contained in relatively small droplets with diameter below 147 $\mu$m. Polymer effleects on spray angle and liquid flow were assessed, since these can affect spray distribution patterns and application volume rates, respectively, in field applications. All sprays became coarser with addition of the polymer of the present invention to tank mixes.

Spray composition having polymers X or Y produced reasonable increases in spray coarseness, with an increase at higher pumping duration.

Droplet size spectrum was observed with respect to the volume median diameter ($D_{v0.5}$), and the spray volume contained in relatively small droplets with diameter less than 147 $\mu$m, for various tank mixes sprayed through specific application conditions simulating ground spraying using disc-core and flat fan nozzles. The droplet diameter 147 $\mu$m was selected because it represents a size class for the laser diffraction instrument, and because there is general agreement in the literature that droplets with diameter from less than 100 to 200 $\mu$m are more likely to drift under unfavorable conditions. Reduction in the percent of the spray volume contained in droplets with a diameter less than 147 $\mu$m is therefore desirable for effective drift potential reduction. The other spray characteristics of spray angle and liquid flow rate were also measured.

Spray solutions were displaced from spray tanks using compressed air. Liquid pressure was measured at the nozzle tip using an Ashcroft pressure gauge connected by a capillary tube to the nozzle tip. Liquid pressure was controlled by adjusting the in-line flow tap prior to the pressure gauge, to achieve 82 psi for the main tests.

A Malvern laser diffraction particle size analyzer was used to characterize the droplet size spectra produced by each treatment. All measurements were made using a 1000 mm focal length lens which measured droplets in the size range 8 to 1880 $\mu$m. Some of the range-finding tests were done using an 800 mm lens; however, the coarseness of the sprays required the conduct of most of the study using the 1000 mm lens.

Droplet size of the droplets contained in the spray clouds produced by the nozzles varied across the spray plume (larger droplets often Occurred at the edge of the plume, and smaller droplets in the center). It was, therefore, important to ensure that a cross-sectional average spray sample is obtained at a given axial location that is representative of the spray plume under evaluation (Dodge, 1988; Snyder et al, 1989). Cross-section averages were obtained by traversing the nozzle vertically down across the laser beam while spraying and sampling. The constant traverse speed was set to sample the entire plume using 4000 sweeps (i.e. each individual replicate actually comprised 4000 individual measurements of the light diffraction pattern).

In addition to entire volumetric and cumulative volumetric droplet size spectra, the $D_{v0.5}$ value was given. The $D_{v0.5}$, or volume median diameter, is the droplet diameter ($\mu$m) at which 50% of the total spray volume is contained in droplets with larger and smaller diameter. These values were calculated by the particle size analyzers in compliance with ASTM Standard E799-87 (ASTM, 1987).

The spray volume contained in relatively small droplets was observed, i.e. those with diameter $<147$ $\mu$m. Since the Malvern instrument has specific size classes, the diameter closest to 150 $\mu$m was used to express these smaller droplets—i.e. the parameter $V<147$ $\mu$m expressed the total spray volume contained in droplets with diameter less than 147 $\mu$m.

The nozzle body was always oriented at 0° straight back from a gentle fan. The fan produced a wind speed of approximately 10–15 mph at the nozzle tip. This has been shown to be important for avoiding number-density weighted sampling effects when sampling such ground-simulated sprays (Hewitt and Valcore, 1995). Ground sprayer forward speeds typically range up to 15 mph.

The liquid sheet angle emitted from each nozzle for each treatment was measured according to ASTM standard techniques using a flexible metal protractor. The angles given for the deflector nozzles are approximate because spray angle varies across the plume for such nozzles, due to the concave design of the deflectors.

Volumetric liquid flow rates were measured by collecting the volume of spray discharged at the required pressure for each treatment per minute time.

Mean droplet size spectra were calculated from the three replicate measurements of each treatment.

Tables 4 and 5 compare the droplet size spectra produced by the different nozzle types after recirculation rate of 2.8 times. The data are sorted in increasing spray coarseness as expressed by the parameter V<147 μm. The column "BCPC/ASAE" indicates the BCPC/ASAE X572 spray quality classification designation for the sprays, according to measured categories used (VF=Very Fine; F=Fine; M=Medium; C=Coarse; VC=Very Coarse; XC=Extra Coarse).

TABLE 4

| Nozzle Type* | Liquid Press. psi | Polymer | Flow Rate mL/min | $D_{v0.5}$ Mm | V < 147 μm % | Spray BCPC/Angle ASAE ° |
|---|---|---|---|---|---|---|
| 11001 | 82 | Y | 528 | 121 | 61.4 | 102 |
| 11001 | 82 | Y | 528 | 117 | 63.5 | 102 |
| 11001 | 82 | Y | 528 | 130 | 59.5 | 102 |
| 11001 | 82 | X | 510 | 126 | 51.4 | 106 |
| 11001 | 82 | X | 510 | 130 | 58.0 | 106 |
| 11001 | 82 | X | 510 | 125 | 59.7 | 106 |

*11001 is a stainless steel flat fan nozzle (BCPC/ASAE Standard X572 reference tip for threshold between Very Fine and Fine spray quality size classes (Hardi Europe, Inc.)).
Polymer no. X = copolymer that contains 50% tBAA and 50% NaAMPS
Polymer no. Y = copolymer that contains 25% tBAA and 75% NaAMPS

TABLE 5

| Nozzle Type* | Liquid Press. psi | Polymer | Flow Rate mL/min | $D_{v0.5}$ Mm | V < 147 μm % | Spray BCPC/Angle ASAE ° |
|---|---|---|---|---|---|---|
| TK-0.5 | 82 | Y | 528 | 126 | 62.0 | 102 |
| TK-0.5 | 82 | Y | 528 | 127 | 60.3 | 102 |
| TK-0.5 | 82 | Y | 528 | 142 | 52.3 | 102 |
| TK-0.5 | 82 | Y | 528 | 132 | 58.6 | 102 |
| TK-0.5 | 82 | X | 516 | 145 | 50.9 | 108 |
| TK-0.5 | 82 | X | 516 | 144 | 51.6 | 108 |
| TK-0.5 | 82 | X | 516 | 146 | 50.6 | 108 |
| TK-0.5 | 82 | X | 516 | 134 | 55.1 | 108 |

*TK-0.5 is a stainless steel deflector nozzle (Spraying Systems Co., Wheaton, IL).
Polymer X = copolymer that contains 50% tBAA and 50% NaAMPS
Polymer Y = copolymer that contains 25% tBAA and 75% NaAMPS The polymer effect on droplet size caused the water sprays to become coarser. The $D_{v0.5}$ values were higher in the following order (largest first; smallest last):

11001 Nozzle:

X>Y>water

TK-0.5 Nozzle:

X>Y>water

Tables 4 and 5 show that there was a general increase in the coarseness of sprays produced by tank mixes containing the polymers of the present invention as compared to spraying water alone.

The data presented in Tables 4 and 5 were for test substances which had been pumped for 2.8 total tank volume recirculation periods through the pump.

The following Table 6 shows data after 11.1 total recirculations through the pump.

TABLE 6

| Nozzle Type* | Liquid Press. psi | Polymer | Flow Rate mL/min | $D_{v0.5}$ μm | V < 147 μm % | Spray BCPC/Angle ASAE ° |
|---|---|---|---|---|---|---|
| 11001 | 82 | Y | 519 | 116 | 63.2 | 102 |
| 11001 | 82 | Y | 519 | 121 | 61.7 | 102 |
| 11001 | 82 | Y | 519 | 114 | 64.3 | 102 |
| 11001 | 82 | X | 510 | 121 | 63.4 | 106 |
| 11001 | 82 | X | 510 | 129 | 60.3 | 106 |
| 11001 | 82 | X | 510 | 124 | 62.9 | 106 |

TABLE 6-continued

| Nozzle Type* | Liquid Press. psi | Polymer | Flow Rate mL/min | $D_{v0.5}$ μm | V < 147 μm % | Spray BCPC/Angle ASAE ° |
|---|---|---|---|---|---|---|
| 11001 | 82 | X | 510 | 126 | 60.0 | 106 |
| TK-0.5 | 82 | Y | 522 | 146 | 50.7 | 102 |
| TK-0.5 | 82 | Y | 522 | 143 | 52.1 | 102 |
| TK-0.5 | 82 | Y | 522 | 150 | 48.9 | 102 |
| TK-0.5 | 82 | X | 524 | 163 | 42.7 | 110 |
| TK-0.5 | 82 | X | 524 | 162 | 44.1 | 110 |

*11001 is a stainless steel flat fan nozzle (BCPC/ASAE Standard X572 reference tip for threshold between Very Fine and Fine spray quality size classes (Hardi Europe, Inc.)).
*TK-0.5 is a stainless steel deflector nozzle (Spraying Systems Co., Wheaton, IL).
Polymer X = copolymer that contains 50% tBAA and 50% NaAMPS
Polymer Y = copolymer that contains 25% tBAA and 75% NaAMPS When compared with the results presented, these data shows that polymers X and Y produced coarser sprays after prolonged pumping.

Ink Composition

The aqueous composition is added to ink compositions to impart aerosol control, shear stability, spatter control, rheology control, and improved transfer capability properties. The improved ability of the ink composition to transfer onto a substrate, such as paper, results in print on the substrate having improved sharpness. The resultant ink composition comprises a solvent and the aqueous composition containing a copolymer of a hydrophobic and hydrophilic monomer according to the present invention, and having aerosol control properties, shear stability, spatter control, rheology control, and improved transfer capability properties.

Deicing or Anti-icing Composition

The aqueous composition is added to deicing or anti-icing compositions to impart aerosol control, surface activity, shear stability, and rheology control. The resultant deicing or anti-icing composition comprises a deicing or anti-icing agent and the aqueous composition containing a copolymer of a hydrophobic and hydrophilic monomer according to the present invention, and has aerosol control capability, shear stability, and rheology control.

Hydro-metallurgy or Electro-winning Composition

The aqueous composition or dispersion containing the polymer of the present invention is utilized in 2 different applications in connection with hydro-metallurgy or electro-winning processes, to impart aerosol control, rheology control, surfactancy, and encapsulent capability.

The first application is when junk ore, referred as "slag" in the industry, is needful of conversion to useful sediment, for example, during the recycling process of junk ore. During this process, a sulfuric acid composition is sprayed onto the junk ore. The aqueous composition of dispersion of the present invention is added to this sulfuric acid composition to impart drift control, shear stability, encapsulant capability, and surfactancy to the sulfuric acid composition, to control misting.

The second application is in connection with the electrolyte commonly used in hydro-metallurgy or electrowinning processes. Hydro-metallurgy or electrowinning also involves a process in which a metal ion-containing solution is placed in contact with at least one cathode and anode, followed by the application of electricity to the solution. As a result, metal (e.g. copper) ions within the solution are plated onto the cathode and thereafter removed in elemental form. It is an electrochemical recovery process is known in the art and discussed in a number of literature references, including Krishman, E. R. et al., Recovery of Metals from Sludges and Wastewaters, Noyes Data Corporation, New Jersey, pp. 38–46 (1993) which is likewise incorporated herein by reference.

Metal-bearing aqueous solution is obtained by dissolving from an ore the desired metal in an aqueous leach liquor. The resulting solution of metal values is mixed with a water-immiscible organic solvent (e.g. kerosene) containing a water-insoluble ion exchange composition having selective affinity for the desired metal values. The aqueous and organic phases are separated.

The desired metal values are removed from the organic phase (which contains the ion exchange composition and the extracted metal values) by mixing with an aqueous strip solution containing strong acid such as sulfuric, phosphoric, or perchloric acid, and having lower pH than the metal-bearing aqueous solution.

The aqueous strip solution extracts the desired metal values into the aqueous phase.

After separation of the organic and aqueous phases, the desired metal values are present in the aqueous strip solution, and the resulting metal-en-iched strip solution is usually referred to as "electrolyte" or "pregnant electrolyte".

The desired metal is recovered in purified form by electroplating the metal from the electrolyte. After recovery of the desired metal, the metal-depleted electrolyte is usually referred to as "spent electrolyte".

During the electrowinning step, elemental metal is plated out at the electrowinning cathode and oxygen evolves at an insoluble anode. The evolution of oxygen gas forms bubbles which entrain strong acid electrolyte, carrying it into the air above the electrowinning tank in the form of a fine mist or spray when the bubbles break. This mist or spray then spreads throughout the electrowinning tankhouse. The acidic mist is corrsive and a health hazard and can cause extreme discomfort to the skin, eyes, and respiratory systems of tankhouse workers, especially during hot weather conditions.

According to the present invention, the aqueous composition or dispersion containing the water-soluble or water-dispersible synthetic polymer is added to the electrolyte, forming a resultant hydro-metallurgy or electro-winning composition comprises the aqueous composition or dispersion containing the polymer according to the present invention, and having aerosol control capability, rheology control capability, surfactancy, and encapsulent capability, preventing the above-mentioned misting.

Cleaner Composition

The aqueous composition according to the present invention is added to cleaner compositions, such as household or industrial cleaner compositions, to impart aerosol control, rheology control, improved transfer capability, and surfactancy. The resultant cleaner composition comprises a detergent and the aqueous composition containing a copolymer of a hydrophobic and hydrophilic monomer according to the present invention, and has aerosol control capability, rheology control capability, improved transfer capability, and surfactancy.

Testing of the Cleaner Composition

Table 7 shows different types of cleaners containing the water-soluble or water dispersible synthetic polymer of the present invention in an amount of 1000 ppm. Table 8 shows the resultant anti-mist performance achieved from the compositions set forth in Table 7.

TABLE 7

| Acid-type cleaners (i.e. typical of Comet brand products) | Hard surface cleaners (ie. typical of Fantastic brand cleaners) | Glass cleaners (i.e. typical of Windex brand cleaners) | Industrial truck/car wash cleaners (i.e. diluted 1 oz. to 2 gallons |
|---|---|---|---|
| 76.7% water | 90.5% water | 92.83% water | 71% water |
| 3.3.% coco amido sulftobetaine (50%) | 2% sodium xylene sulfonate (40%) | 4% isopropanol | 5% sodium xylene sulfonate (40%) |
| 2% nonylphenoxy polyethoxy-ethanol | 2% tetrasodium EDTA (40%) | 2.5% ethylene glycol monobutyl ether | 3% triethanol-amine |
| 5% dipropylene glycol n-butyl ether | 1% sodium metasilicate, pentahydrate | .05% nonyl-phenoxy poly-ethoxyethanol | 5% tetrasodium EDTA (40%) |
| 10% citric acid | 3% ethylene glycol monobutyl ether | .02% fluoro-surfactant | 16% sodium dodecylben-zene sulfonate (60%) |
| 3% sodium xylene sulfonate (40%) | 1.5% sodium dodecylbenzene sulfonate (60%) | .6% ammonium hydroxide | |
| Optionally a water-soluble or water dispersible synthetic polymer (Polymer A, B, or C) | Optionally a water-soluble or water dispersible synthetic polymer (Polymer A, B, or C) | Optionally a water-soluble or water dispersible synthetic polymer (Polymer A, B, or C) | Optionally a water-soluble or water dis-persible syn-thetic polymer (Polymer A, B, or C) |

Polymer A = copolymer that contains 75% tBAA and 25% NaAMPS
Polymer B = copolymer that contains 25% tBAA and 75% NaAMPS
Polymer C = copolymer that contains 50% tBAA and 50% NaAMPS

TABLE 8

Mist Control Performance

| Polymer added (ppm) | Acid-type Cleaner | All Purpose Cleaner | Glass Cleaner | Industrial Truck/car Wash Cleaner (i.e. diluted 1 oz. to 2 gallons) |
|---|---|---|---|---|
| Control (none) | 5.0 | 5.0 | 5.0 | 5.0 |
| Polymer A (1000 ppm) | 0.7 | 1.2 | 0.5 | 0.1 |
| Polymer B (1000 ppm) | 2.7 | 3.8 | 0.8 | 0.8 |
| Polymer C (1000 ppm) | 2.7 | 4.0 | 0.5 | 0.2 |

Polymer A = copolymer that contains 75% tBAA and 25% NaAMPS
Polymer B = copolymer that contains 25% tBAA and 75% NaAMPS
Polymer C = copolymer that contains 50% tBAA and 50% NaAMPS
Rating Scale:
5.0 = misting equal to the control without additives
4.0 = 80% of control misting
3.0 = 60% of control misting
2.0 = 40% of control misting
1.0 = 20% of control misting
0.0 = less than 20% of control misting

Adhesive Composition

The aqueous composition is added to adhesive compositions to impart aerosol control, shear stability, rheology control, surface activity, and improved transfer capability. The resultant adhesive composition comprises a resin and the aqueous composition containing a copolymer of a hydrophobic and hydrophilic monomer according to the present invention, and has aerosol control capability, shear stability, rheology control capability, and improved transfer capability.

Fire-extinguishing Chemical Composition

The aqueous composition is added to fire-extinguishing chemical compositions to impart aerosol control, shear stability, rheology control, and drag reduction. The resultant fire-extinguishing chemical composition comprises a fire retarding agent and the aqueous composition containing a copolymer of a hydrophobic and hydrophilic monomer according to the present invention, and has aerosol control capability, shear stability, rheology control capability, and surface activity.

Organosilane Composition

The aqueous composition is added to compositions having organosilanes used in fiberglass making to impart aerosol control, shear stability, surfactancy, and encapsulent capability.

In particular, in the art of glass fiber manufacture, sizing compositions useful for impregnating strands of glass with a thermoplastic resin are applied during the fiber forming process. In this way, the glass fiber is pre-impregnated with the thermoplastic resin during the glass fiber forming process.

The size composition is directly blended with the thermoplastic resin, forming a slurty composition, during the glass fiber forming process. This slurry composition for impregnating the glass fibers typically includes a thermoplastic resin, a coupling agent such as a silane, a binder or film former material and a thickening agent.

It is this slurty that the aqueous composition or dispersion of the present invention is added to impart aerosol control capability, rheology modification, shear stability, surfactancy, and encapsulent capability. The slurry composition is applied to the glass fiber during the fiber forming operation.

The composition of this invention can thus be applied as a size for glass fibers during the fiber forming operation and the resulting sized thermoplastic impregnated glass fibers can then be fabricated into glass fiber reinforced products.

Personal Care Composition

The aqueous composition or dispersion of the present invention functions in 2 different ways in connection with personal care compositions.

The first way is that it functions by imparting rheology control, oil/water reduction, emollient performance, film forming capability, and surfactancy, and also as a thickening agent, to personal care compositions including hand lotions, body creams, soaps, suntan lotions, hair conditioners, after-shave lotions, lip balms, cold creams, bubble bath, and cleansing lotions, forming resultant personal care product compositions having such properties.

The second way is that it functions by imparting aerosol control and transfer efficiency, to personal care compositions such as hair spray, deodorant, and perfume, which are applied by using a pump or spraying action, forming resultant personal care product compositions having such properties.

Latex or Other Waterborne Compositions

The aqueous composition is added to latex or other waterboine compositions, to impart rheology control, aerosol control, adhesion, and transfer efficiency. Latex and other waterborne compositions include either water-dispersible or water-soluble compositions. A detailed descriptions of these compositions can be found in Martens, Charles R. *WATER-BORNE COATINGS, Emulsions and Water-Soluble Paints* Van Nostrand Reinhold: New York, 1981 Chapters 4 and 5, incorporated by reference in their entirety herein. The water-dispersible compositions are dispersions or emulsions that contain a water insoluble polymer. These are typically called a resin by those skilled in the art and include materials, such as, but not limited to, polyurethane resins, epoxy resins, alkyd resins or polyester resins. In the water-dispersible compositions, the resin is dispersed or emulsified in water with the aid of a surfactant. The surfactants are those conventional materials known in the art as useful in making these dispersions or emulsions. The water-soluble compositions are those compositions that use resins that are water soluble such as but not limited to, anionic acrylic resins, cationic amine functionalized resins, and non-ionic hydroxy functionalized resins.

Textile Finish Composition

The aqueous composition is added to textile finish compositions, such as textile knitting fluids or fiber finishing formulations, to impart shear stability, sling control, lubricity, anti-wear properties, oil/water reduction, and surfactancy.

In the manufacture of textile yarns, it is economically important to process the yarn fibers at high speeds. A number of problems arise because of high speed operations; for example, the yarn fibers are subject to breakage due to tension developed in yarn stretching and winding operations and the yarn fibers undergo excess wear and fraying as a result of friction caused by the high speed movement of the yam fibers over metal and ceramic machinery guides.

To overcome these problems, a lubricant has been applied to the yarn fibers. Lubricants overcome the above-mentioned problems, and they also provide additional benefits, for example, they effect even winding of fiber yarns onto cones and subsequent smooth release of the yarn from the cones during knitting, weaving and tufting operations.

On the other hand, the use of lubricants in yarn processing creates slinging, i.e., the throwing of lubricant from the yarn as it moves at high speeds. Oil slung from yarns accumulates on the floor of the work space, thereby creating an untidy and dangerous condition. Furthermore, oil sling often results in the formation of a mist in the area, resulting in a breathing hazard.

The resultant textile finish composition of the present invention overcomes the problems associated with oil sling. The resultant textile finish composition of the present invention comprises a binding agent and the aqueous composition containing a copolymer of a hydrophobic and hydrophilic monomer according to the present invention, and has shear stability, sling control, lubricity, anti-wear properties, oil/water reduction, and surfactancy.

Water-based Hydraulic Composition

The aqueous composition is added to water-based hydraulic fluids to impart shear stability, rheology control, lubricity, thickening, and anti-wear properties. The resultant water-based hydraulic fluid comprises a hydraulic fluid agent and the aqueous composition containing a copolymer of a hydrophobic and hydrophilic monomer according to the present invention, and has shear stability, rheology control, lubricity, and anti-wear properties.

For the hydraulic fluid composition according to the present invention, additives include anti-foam agents, metal deactivators, and corrosion inhibitors, antimicrobial, anticorrosion, extreme pressure, antiwear, antifriction, and antirust agents. Typical anti-friction agents include overbased sulfonates, sulfurized olefins, chlorinated paraffins and olefins, sulfurized ester olefins, amine terminated polyglycols, and sodium dioctyl phosphate salts. Useful anti-foam agents include: alkyl polymethacrylates, and polymethylsiloxanes. Metal deactivators include materials such as tolyltriazoles. Corrosion inhibitors include carboxylic/boric acid diamine salts, carboxylic acid amine salts, alkanol amines, alkanol amine borates and the like. Such materials are well known to those skilled in the art as shown in U.S. Pat. No. 4,493,777, incorporated herein by reference in its entirety.

Depending upon the particular hydraulic fluid composition formed according to the present invention, the hydraulic fluid compositions of the present invention may also be oil-containing emulsions. The emulsion compositions contain the same types and amounts of polymers as the purely aqueous hydraulic fluid compositions discussed above. The compositions may also contain the property improving additives used in the purely aqueous hydraulic fluid compositions, also noted above. The types of oils that can be used in the oil-containing emulsions include both natural and synthetic oils and mixtures thereof. Specific examples and amounts of oils are described in U.S. Pat. Nos. 5,531,911 and 4,326,972, incorporated herein by reference in their entirety. A good discussion of emulsions useful in preparation of oil-containing emulsions is found in The Kirk-Othmer Encyclopedia of Chemical Technology ($3^{rd}$ Edition, V. 8, pp. 900–930).

Dust Control Composition

The aqueous composition is used duling mining operations to impart dust control. It is added to compositions to impart particulate control to the treated material.

Dust suppression is the reduction of the extent to which finely divided solid particulate material becomes suspended in the air. A variety of materials such as coal, sulfur, phosphate, clay, and other finely divided ores and minerals, generate dust in transfer and handling operations during, mining, transportation, storage, and use.

It is known to suppress dust in mines by spraying with various aqueous systems containing chemical additives to improve working conditions and reduce the toxicological risks and explosion hazards. For example, U.S. Pat. No. 4,425,252 describes a method to abate coal dust using an anionic surfactant, preferably sodium dodecyclbenzene sulphonate and a nonionic surfactant, preferably a polycthoxylatcd nonylphenol, in an aqueous formulation. The method comprises spraying the coal dusty area with a formulation complising water containing up to 0.1% by weight of the mixture of the anionic surfactant, i.e., a water soluble salt of an alkyl aryl sulfonic acid and nonionic surfactant having an HLB of from 10 to 16. Optimally, the mixture contains one or more cosolvents generally of the class of alkylene glycol monoalkyl ethers, $C_2$ to $C_5$ alkanols and mixtures thereof.

U.S. Pat. No. 4,561,905 describes a dust suppression mixture of oil, water and a surfactant in the form of an emulsion that is diluted and foamed. The foam is then sprayed into a falling mass of coal. The oils suitable for use are described as heavy process oils and include asphalt dissolved in a moderately heavy oil, residual flush oils or relatively high viscosity fuel oil. The preferred oils have a viscosity in the range of from approximately 600 to 7,000 SUS at 38° C., a pour point in the range of approximately −18 to 21° C., a molecular weight of at least 300 and a boiling point of at least 204° C.

U.S. Pat. No. 4,944,892 teaches an aqueous composition which comprises a linear primary alcohol ethoxylate surfactant, a suitable scenting oil such as pine oil or lemon oil and water among other adjuvants. U.S. Pat. No. 3,367,878 shows a composition which comprises 20.2% by weight water, 1.0% by weight pine oil, 1.8% by weight sodium xylene sulphonate surfactant.

Thus, various techniques have been developed to suppress mining dust, and many of the techniques are effective for reducing dust. However, utilizing the aqueous composition or dispersion of the present invention satisfies the needs for improvement in dust suppression in connection with modern mining practices.

Amount of Copolymer in a Resultant Composition

It is desirable to include the polymer at a level which is effective to impart a desired property or properties. It is also desirable to use the polymers at the lower levels of their effective concentration range. The amount will vary according to the particular application, in amounts that provide the most desirable effects.

As an example, to impart aerosol control or particulate control to a given composition, many factors affect the level of polymer required to achieve a level of aerosol control effect. The shear level in the particular application, and the rate of movement of the composition at the nozzle or at the pump or at both, all influence the amount of aerosol control required.

Typically, the polymer is used in an amount of from about 0.005 to about 50 weight percent based upon the total weight of the resultant composition. A mixture of the different types of polymers according to the present invention may also be used to prepare the resultant compositions, wherein the mixture is in an amount of from about 0.005 to about 50 weight percent based upon the total weight of the resultant composition.

Alternatively, and in a preferred embodiment, the following amounts are used in the respective application.

The aqueous composition or dispersion is contained in the agricultural spray composition in an amount of from about amount of about 1 to about 1000 ppm, more preferably from about 100 to about 250 ppm.

The aqueous composition or dispersion is contained in the ink composition in an amount of about 2 to about 100 ppm, more preferably from about 5 to about 10 ppm.

The aqueous composition or dispersion is contained in the deicing or anti-icing composition in an amount of at least about 500 ppm, more preferably from about 500 to about 2500 ppm.

The aqueous composition or dispersion is contained in the hydro-metallurgy, electro-winning composition in an amount of about 1 to about 5000 ppm, more preferably from about 500 to about 2500 ppm.

The aqueous composition or dispersion is contained in the household cleaner composition in an amount of about 1 to about 2500 ppm, more preferably from about 50 to about 1000 ppm.

The aqueous composition or dispersion is contained in the adhesive composition in an amount of about 1 to about 5000 ppm, more preferably from about 500 to about 2500 ppm.

The aqueous composition or dispersion is contained in the fire-extinguishing chemical composition in an amount of about 1 to about 2500 ppm, more preferably from about 1 to about 1000 ppm.

The aqueous composition or dispersion is contained in the personal care composition in an amount of about 1 to about 2500 ppm, more preferably from about 50 to about 1000 ppm. This is applicable to both cases (1) when the aqueous composition or dispersion is used for mist control and (2) when it is used as a thickener for the personal care composition.

The aqueous composition or dispersion is contained in the latex composition in an amount of about 1 to about 5000 ppm, more preferably from about 100 to about 2000 ppm.

The aqueous composition or dispersion is contained in said textile composition in an amount of about 1 to about 5000 ppm, more preferably from about 50 to about 2000 ppm.

The aqueous composition or dispersion is contained in the organosilane composition in an amount of about 1 to about 5000 ppm, more preferably from about to about 1000 ppm.

The aqueous composition or dispersion is contained in the dust control composition in an amount of about 1,000 to about 50,000 ppm, more preferably from about 10,000 to about 25,000 ppm.

Other Components or Additives

Agricultural Spray Composition

The agricultural spray composition typically contains an effective amount of a plant growth regulant or herbicide, as well a one or more substances that are not herbicides, or plant growth regulants, such as surfactants, dyes, humectants, corrosion inhibitors, stickers, spreaders, thickeners, fertilizers, and penetrants. These components can be blended with water to form a diluted solution for the desired application.

Ink Composition

The ink composition typically comprises a colored composition (dye composition) and a liquid vehicle that is compatible with the colored composition. Optional additives, depending upon the application for which it is intended, and not limited to, are charge carriers, stabilizers against thermal oxidation, viscoelastic properties modifiers, humectants, cross-linking agents, plasticizers, charge control additives, such as a quaternary ammonium salt; flow control additives such as hydrophobic silica, zinc stearate, calcium stearate, lithium stearate, polyvinyistearate, and polyethylene powders; and fillers such as calcium carbonate, clay and talc, among other additives used by those having ordinary skill in the art.

The liquid vehicle is any liquid solvent or carrier that is compatible with the colored composition such that the improved ink is suitable for use in inks for ink jet printing. For ink to be used in thermal ink jet printers it is desirable that the liquid vehicle is water. Alternatively, the liquid vehicle may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivative carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70. The non-water component of the liquid vehicle generally serves as a humectant which has a boiling point higher than that of water (100° C.).

Polymeric additives or dispersants are typically added to the inks to enhance the viscosity of the ink. Examples include, but are not limited to, water soluble polymers such as Gum Arabic, polyacrylate salts, polymethacrylate salts, polyvinyl alcohols, hydroxypropylcellulose, hydroxyethylcellulose, polyvinyl-pyololidinone, polyvinylether, starch, polyethyleneoxide, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine or other polyethyleneimine derivatives can be added to the ink. Polymeric additives can be present in the ink of the present invention in any effective amounts, typically from 0 to about 10 percent by weight, and desirably from about 0.01 to about 5 percent by weight.

Deicing or Anti-icing Composition

Deicing or anti-icing compositions typically contain components such as a blend of water and ethylene glycol or propylene glycol, in a ratio that ranges from 50:50, water to glycol, to about 20:80. The terms "deicing composition" and "anti-icing composition" are used interchangeably. These compositions are sometimes diluted with water in the end use to match the weather conditions. Deicing or anti-icing compositions have been classified as unthickened and thickened.

Hydro-metallurgy or Electro-winning Composition

The aqueous composition containing a copolymer of a hydrophobic and hydrophilic monomer according to the present invention is added to an aqueous strip solution used for plating or to a sulfuric acid solution used for recycling junk ore.

Household Cleaner Composition

Housecleaner compositions typically contain a primary cleaning agent, surfactants, such as anionic, nonionic, cationic or amphoteric surfactants, a compatible solvent, and organic thickeners. Such compositions can also include a water soluble acrylic polymer which can act to condition the household cleaner composition under end-use conditions.

Adhesive Composition

The adhesive composition can include an olefinic component and an elastomer component, resin and/or polymeric tackifiers, such as natural rosins, hydrogenated rosins, polyterpenes, terpene-phenolics, rosin esters, atactic polypropylene, petroleum hydrocarbon resins, and the like. Of particular utility in adjusting viscosity and hardness is the use of waxes or the wax-like materials including, for example, petroleum waxes such as paraffin and microcrystalline wax, or synthetic waxes such as Fischer-Tropsch wax.

If required, the adhesive composition may contain various additives such as antioxidants, ultraviolet absorbers, surface modification agents such as slip and/or antiblock additives, antistatic agents, mold releasing agents, lubricants, and pigments.

Fire-extinguishing Chemical Composition

Fire-extinguishing chemical compositions include a variety of components. Depending upon the technique needed for flame suppression, either chemical or physical action, or both, are relied upon to achieve the flame suppression.

One conventional agent that is utilized is a pressurized water extinguisher model that functions solely by thermal energy absorption. Such models are not suitable, however, for use on electrical or flammable-liquid fires. Carbon dioxide ($CO_2$) and dry-chemical extinguishers are in use and typically displace oxygen and absorb thermal energy, although dry-chemicals typically leave a corrosive residue.

Even better for use against grease fires are sodium bicarbonate extinguishers, as well as potassium bicarbonate, urea-based potassium bicarbonate, and potassium chloride extinguishers, although the latter types leave a heavy powdered chemical residue that can damage electrical equipment.

Yet another conventional fire extinguisher is the foam (AFFF or FFFP) model, which coats flammable liquids with a chemical to lower the temperature or eliminate oxygen supply, although these are not suitable for electrical fires.

The toxic effects of certain agents, such as haloalkenes, include simulation or suppression of the central nervous system, initiation of cardiac arrhythmias, and sensitization of the heart to adrenaline. Inhalation of oaseous haloalkanes can cause bronchoconstriction, reduce pulmonary compliance, depress respiratory volume, reduce mean arterial blood pressure, and produce tachycardia. Long term effects can include hepatotoxicity, mutagenesis, teratogenesis, and carcinogenicity. The ability to suppress mist formation is such composition having these agents is therefore very desirable.

Personal Care Composition

The personal care composition include hairsprays, shampoos, hair conditioners, skin creams and lotions, make-up products, antiperspirants and deodorants, shaving creams, topical drug compositions, including a variety of cosmetic and pharmaceutical compositions for topical application to the skin, sunscreen products, and the like. Typical caniers and additional components typical used in personal care compositions are as set forth in U.S. Pat. No. 5,863,597, incorporated by reference herein in its entirety. The carriers can be selected from the group consisting of mousses, gels, lotions, creams, ointments, tonics, sprays, aerosols, shampoos, conditioners, rinses, bar soaps, hand lotions body lotions, facial moisturizers, andsolid gel sticks. These include conditioners, humectants and moisturizers, surfactants, carboxylic acid copolymer thickeners, emulsifiers, among other additional components, all listed in this patent.

The Water Based Hydraulic Composition

For the hydraulic fluid composition according to the present invention, additives include anti-foam agents, metal deactivators, and corrosion inhibitors, antimicrobial, anticorrosion, antiwear, antifriction, and antirust agents. Typical anti-friction agents include overbased sulfonates, sulfurized olefins, chlorinated paraffins and olefins, sulfurized ester olefins, amine terminated polyglycols, and sodium dioctyl phosphate salts. Useful anti-foam agents include alkyl polymethacrylates, and polymethylsiloxanes. Metal deactivators include materials such as tolyltriazoles. Corrosion inhibitors include carboxylic/boric acid diamine salts, carboxylic acid amine salts, alkanol amines, alkanol amine borates and the like. Such materials are well known to those skilled in the art as shown in U.S. Pat. No. 4,493,777, incorporated herein by reference in its entirety.

Depending upon the particular hydraulic fluid composition formed according to the present invention, the hydraulic fluid compositions of the present invention may also be oil-containing emulsions. The emulsion compositions contain the same types and amounts of polymers as the purely aqueous hydraulic fluid compositions discussed above. The compositions may also contain the property improving additives used in the purely aqueous hydraulic fluid compositions, also noted above. The types of oils that can be used in the oil-containing emulsions include both natural and synthetic oils and mixtures thereof. Specific examples and amounts of oils are described in U.S. Pat. Nos. 5,531,911 and 4,326,972, incorporated herein by reference in their entirety. A good discussion of emulsions useful in preparation of oil-containing emulsions is found in The Kirk-Othmer Encyclopedia of Chemical Technology ($3^{rd}$ Edition, V. 8, pp. 900–930).

Organosilane Composition

Typical additives included in the organosilane composition are those typically found is sizing composition used during glass fiber manufacturing. They include coupling agents, binders, film former materials, and thickening agents.

Dust Control Composition

Typically, a dust control composition will include oil, such as citrus peel oils, orange oil, grapefruit oil and lemon oil, at least one suifactant, such as anionic and nonionic surfactants, and a variety of additives such as antioxidants and preservatives. U.S. Pat. No. 4,425,252, U.S. Pat. No. 4,551,261, U.S. Pat. No. 4,971,720, and U.S. Pat. No. 4,561,905 are incorporated herein for their disclosure regarding additional components in dust control compositions.

Latex or Other Waterborne Compositions

The phrase "latex composition" or "latex coating composition" as used throughout this specification and claims means latex or other waterborne compositions as defined below.

A latex composition or latex coating composition is typically prepared by polymerization processes which are known in the art, and particularly by the known latex emulsion polymerization processes, including both seeded and unseeded latex polymerization. Typical processes are those described in U.S. Pat. Nos. 4,478,974; 4,751,111; 4,968,740; 3,563,946 and 3,575,913, and German Patent Publication No. 1,905,256, these patents being incorporated by reference in their entirety herein. The method of introduction of the monomers and other ingredients, such as polymerization aids, is not particularly critical. The polymerization is then carried out under conventional conditions until the desired degree of polymerization is achieved. Crosslinkers and the well-known latex polymerization aids such as initiators, surfactants and emulsifiers have been used as needed.

Representative initiators typically used in making latex compositions are well-known in the art and include, for example, thermal initiators that are oil-soluble, such as higher alkyl peroxides or azo compounds or thermal initiators which are water-soluble such as persulfate; redox pairs including sodium bisulfite and sodium persulfate, ferrous ions and a peroxide (Fenton's reagent), cuprous ions and peroxide, and ferrous ions and sodium persulfate wherein the peroxides can include benzoyl peroxide, hydrogen peroxide, or t-butyl peroxide. Examples of oil-soluble thermal initiators are azobisisobutyronitrile and t-butylperoctoate.

Typical crosslinkers include crosslinkable monomers, such as, for example, N-methylol acrylamide, N-methylol methacrylamide, glycidyl acrylate, glycidyl methacrylate, ethylene glycol dimethacrylate, allyl methacrylate, propylene glycol dimethacrylate, divinylbenzene; and acryloxy alkylsilanes, such as, for example, .alpha.-acryloxypropyl trimethoxysilane. Preferred crosslinkable monomers, for use in the present invention, are allyl methacrylate, glycidyl methacrylate, and acryloxy alkylsilanes. These crosslinkable monomers, if used, are typically employed at levels of from 0.05 to 10, preferably 0.05 to 5 weight percent, more preferably 0.05 to 2 weight percent, based on the weight of the total polymer.

Surfactants or emulsifiers suitable for use herein include those conventional surface active agents typically known in the art for polymerization processes. The sulfactant(s) can be added to the aqueous phase and/or monomer phase. An effective amount of surfactant in a seeded process is that amount selected to assist in stabilizing the particle as a colloid, minimizing contact between the particles and preventing coagulation. In an unseeded process, an effective amount of surfactant will be that amount selected to influence the particle size.

Representative surfactants include saturated and ethylenically unsaturated sulfonic acids or salts thereof, including, for example, hydrocarbonsulfonic acids, such as, vinylsulfonic acid, allylsulfonic acid, and methallylsulfonic acid, and salts thereof; aromatic hydrocarbon-sulfonic acids, such as, for example, p-styrenesulfonic acid, isopropenylbenzene-sulfonic acid, and vinyloxybenzene-sulfonic acid, and salts thereof; sulfoalkyl esters of acrylic acid and methacrylic acid, such as, for example, sulfoethyl methacrylate and sulfopropyl methacrylate and salts thereof; and 2-acrylamido-2-methylpropanesulfonic acid and salts thereof; alkylated diphenyl oxide disulfonates, sodium dodecyl benzene sulfonates and dihexyl esters of sodium sulfosuccinic acid, ethoxylated alkyl phenols and ethoxylated alcohols.

Various protective colloids may also be used in place or in addition to the surfactants described above. Suitable colloids include partially acetylated polyvinyl alcohol, casein, hydroxyethyl starch, carboxymethyl cellulose, hydroxyethyl cellulose, hydroxypropyl cellulose and gum arabic. The preferred protective colloids are carboxymethyl cellulose, hydroxyethyl cellulose and hydroxypropyl cellulose. In general, these protective colloids are used at levels of 0 to 10, preferably 0 to 5, more preferably 0 to 2 parts by weight, based on the total weight of the monomers.

Various other additives and ingredients known to those skilled in the art can be incorporated to prepare a latex composition. Such additives include, for example, anti-foaming agents, wetting agents, thickeners, plasticizers, fillers, pigments, crosslinkers, antioxidants and metal chelating agents may be used. Known anti-foaming agents include silicon oils and acetylene glycols. Common known wetting agents include alkylphenol ethoxylates, alkali metal dialkyl sulphosuccinates, acetylene glycols and alkali metal alkyl sulphates. Typical thickeners include polyacrylates, polyacrylamides, xanthan gums, modified celluloses or particulate thickeners such as silicas and clays. Typical plasticizers include mineral oil, liquid polybutenes, liquid polyacrylates and lanolin. Zinc oxide, titanium dioxide, aluminum hydrate, calcium carbonate, and clay are typically employed fillers.

In addition to the latex compositions described above, which include only those latices that would be made by free radical polymerization, for example, acrylics, styrene-acrylics or vinyl acetate-acrylics, other waterborne compositions known in the art can be used with the polymers of the present invention. These resins are made by other known methods of polymerization, and are set forth below.

The other waterborne compositions known in the art that can be used with the polymers of the present invention can be either water-dispersible or water-soluble compositions. A detailed description of these compositions can be found in Martens, Charles R. *WATERBORNE COATINGS, Emulsions and Waiter-Soluble Paints* Van Nostrand Reinhold: New York, 1981 Chapters 4 and 5 incorporated by reference in its entirety herein. The water-dispersible compositions can be described as dispersions or emulsions that contain a water insoluble polymer. These are typically called a resin by those skilled in the art and include materials, such as but not limited to, polyurethane resins, epoxy resins, alkyd resins or polyester resins. In the water-dispersible compositions, the resin would be dispersed or emulsified in water with the aid of a surfactant. The surfactants are those conventional materials known in the art as useful in making these dispersions or emulsions. Typical surfactants are described above. The water-soluble compositions are those compositions that use resins that are water soluble such as but not limited to, anionic acrylic resins, cationic amine functionalized resins, and non-ionic hydroxy functionalized resins. Both of these compositions can incorporate additives such as described above, for example, anti-foaming agents, wetting agents, thickeners, pigments, etc.

Textile Finish Composition

Various additives typically used in textile lubricant formulations are usually designed to increase the adhesive and cohesive strengths of the lubricants without reducing their lubricity. U.S. Pat. Nos. 3,977,979; 4,098,702; 4,098,703 and 4,105,569 disclose the use of ethylene-propylene copolymer, isobutylene homopolymer or copolymer and other polymers as viscosity index improvers for yarn finishing formulations. U.S. Pat. No. 4,031,158 states that the polyolefin oils disclosed therein can be used as textile finishing agents. All of these patents are incorporated in their entirety herein by reference.

It will be readily apparent to those skilled in the art that various changes and modifications of an obvious nature may be made without departing from the spirit of the invention, and all such changes and modifications are considered to fall within the scope of the present invention as defined by the appended claims.

What is claimed is:

1. A method of imparting aerosol control and shear stability to a first composition comprising incorporating therein an aqueous composition or dispersion comprising about 1 to about 5000 parts per million of a water-soluble or water-dispersible synthetic polymer formed by polymerizing (A) a hydrophobic monomer selected from the group consisting of A(I) an alkyl substituted acrylamide compound having the formula:

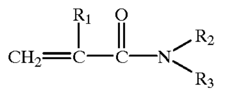

wherein $R_1$ is a hydrogen or a methyl group and $R_2$ and $R_3$ are independently hydrogen or hydrocarbyl groups, provided that the total number of carbon atoms in $R_2$ and $R_3$ combined is between 4 and 36, and A(II) an acrylate ester of the following formula:

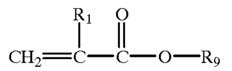

where $R_1$ is a hydrogen or a methyl group and $R_9$ is a hydrocarbyl group containing between 1 and 20 carbon atoms; and (B) a hydrophilic monomer selected from the group consisting of B(I) acrylamido sulfonic acids having the formula:

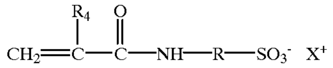

wherein $R_4$ is a hydrogen or a methyl group and R is an aliphatic or aromatic hydrocarbon group containing from 2 to 12 carbon atoms; B(II) acrylamido disulfonic acids having the formula:

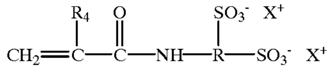

wherein $R_4$ is a hydrogen or a methyl group and R is an aliphatic or aromatic hydrocarbon group containing from 2 to 8 carbon atoms, and B(III) a styrene sulfonic acid having the formula:

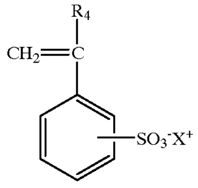

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

$R_5R_6R_7R_8N^+$ wherein $R_5$, $R_6R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99, whereby said first composition retains effective aerosol control properties even after it is subjected to a shear rate of from about 99,000 to about 1,000,000 $s^{-1}$, and a shear stress of from about 30,000 pascals to about 500,000 pascals.

2. The method of claim 1, wherein said composition is an agricultural spray composition.

3. The method of claim 1, wherein said composition is an ink composition.

4. The method of claim 1, wherein said composition is a deicing or an anti-icing composition.

5. The method of claim 1, wherein said composition is a hydro-metallurgy, electro-winning composition.

6. The method of claim 1, wherein said composition is a household cleaner composition.

7. The method of claim 1, wherein said composition is an adhesive composition.

8. The method of claim 1, wherein said composition is a fire-extinguishing chemical composition.

9. The method of claim 1, wherein said composition is a personal care composition.

10. The method of claim 1, wherein said composition is latex composition.

11. The method of claim 1, wherein said composition is a textile finish composition.

12. The method according to claim 1, wherein said polymer is a copolymer formed by copolymerizing said hydrophobic monomer and said hydrophilic monomer.

13. The method according to claim 1, wherein said polymer further comprises (C) at least one additional monomer unit that is polymerizable with said hydrophobic monomer and said hydrophilic monomer.

14. A method of imparting particulate control and shear stability to a first composition comprising incorporating therein an aqueous composition or dispersion comprising about 1 to about 5000 parts per million of a water-soluble or water-dispersible polymer formed by polymerizing (A) a hydrophobic monomer selected from the group consisting of A(I) an alkyl substituted acrylamide compound having the formula:

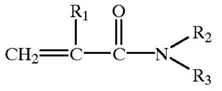

wherein $R_1$ is a hydrogen or a methyl group and $R_2$ and $R_3$ are independently hydrogen or hydrocarbyl groups, provided that the total number of carbon atoms in $R_2$ and $R_3$ combined is between 4 and 36, and A(II) an acrylate ester of the following formula:

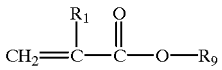

where $R_1$ is a hydrogen or a methyl group and $R_9$ is a hydrocarbyl group containing between 1 and 20 carbon atoms; and (B) a hydrophilic monomer selected from the group consisting of B(I) acrylamido sulfonic acids having the formula:

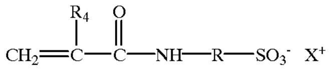

wherein $R_4$ is a hydrogen or a methyl group and R is an aliphatic or aromatic hydrocarbon group containing from 2 to 12 carbon atoms; B(II) acrylamido disulfonic acids having the formula:

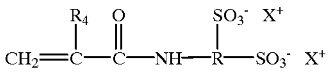

wherein $R_4$ is a hydrogen or a methyl group and R is an aliphatic or aromatic hydrocarbon group containing from 2 to 8 carbon atoms, and B(III) a styrene sulfonic acid having the formula:

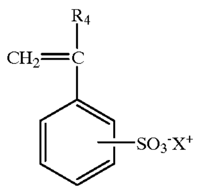

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

$R_5R_6R_7R_8N^+$ wherein $R_5$, $R_6R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99, whereby said first composition retains effective particulate control properties even after it is subjected to a shear rate of from about 99,000 to about 1,000,000 $s^{-1}$, and a shear stress of from about 30,000 pascals to about 500,000 pascals.

15. The method of claim 14, wherein said composition is an organosilane composition.

16. The method of claim 14, wherein said composition is a dust control composition.

17. A method of imparting aerosol control and shear stability to a first composition comprising incorporating therein an aqueous composition or dispersion comprising about 1 to about 5000 parts per million of a water-soluble or water-dispersible synthetic polymer formed by polymerizing (A) a hydrophobic monomer selected from the group consisting of A(I) an alkyl substituted acrylamide compound having the formula:

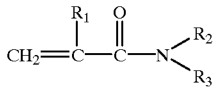

wherein $R_1$ is a hydrogen or a methyl group and $R_2$ and $R_3$ are independently hydrogen or hydrocarbyl groups, provided that the total number of carbon atoms in $R_2$ and $R_3$ combined is between 2 and 36, and A(II) an acrylate ester of the following formula:

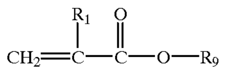

where $R_1$ is a hydrogen or a methyl group and $R_9$ is a hydrocarbyl group containing between 1 and 20 carbon atoms; and (B) a hydrophilic monomer selected from the group consisting of B(I) acrylamido sulfonic acids having the formula:

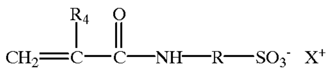

wherein $R_4$ is a hydrogen or a methyl group and R is an aliphatic or aromatic hydrocarbon group containing from 2 to 12 carbon atoms; and B(II) acrylamido disulfonic acids having, the formula:

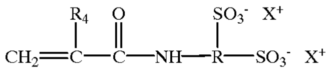

wherein $R_4$ is a hydrogen or a methyl group and R is an aliphatic or aromatic hydrocarbon group containing from 2 to 8 carbon atoms;

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

$R_5R_6R_7R_8N^+$ wherein $R_5R_6R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99, whereby said first composition retains effective aerosol control properties even after it is subjected to a shear rate of from about 99,000 to about 1,000,000 $s^{-1}$, and a shear stress of from about 30,000 pascals to about 500,000 pascals.

18. A method of imparting particulate control and shear stability to a first composition comprising incorporating therein an aqueous composition or dispersion comprising about 1 to about 5000 parts per million of a water-soluble or water-dispersible polymer formed by polymerizing (A) a hydrophobic monomer selected from the group consisting of A(I) an alkyl substituted acrylamide compound having the formula:

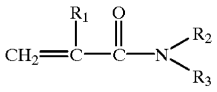

wherein $R_1$ is a hydrogen or a methyl group and $R_2$ and $R_3$ are independently hydrogen or hydrocarbyl groups, provided that the total number of carbon atoms in $R_2$ and $R_3$ combined is between 2 and 36, and A(II) an acrylate ester of the following formula:

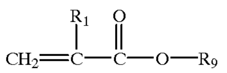

where $R_1$ is a hydrogen or a methyl group and $R_9$ is a hydrocarbyl group containing between 1 and 20 carbon atoms; and (B) a hydrophilic monomer selected from the group consisting of B(I) acrylamido sulfonic acids having the formula:

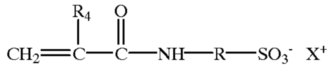

wherein $R_4$ is a hydrogen or a methyl group and R is an aliphatic or aromatic hydrocarbon group containing from 2 to 12 carbon atoms; and B(II) acrylamido disulfonic acids having the formula:

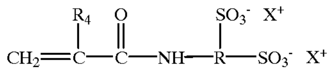

wherein $R_4$ is a hydrogen or a methyl group and R is an aliphatic or aromatic hydrocarbon group containing from 2 to 8 carbon atoms;

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

$R_5R_6R_7R_8N^+$ wherein $R_5$, $R_6$, $R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99, whereby said first composition retains effective particulate control properties even after it is subjected to a shear rate of from about 99,000 to about 1,000,000 $s^{-1}$, and a shear stress of from about 30,000 pascals to about 500,000 pascals.

19. The method of claim 17 wherein the total number of carbon atoms in $R_2$ and $R_3$ combined is at least 4.

20. The method of claim 18 wherein the total number of carbon atoms in $R_2$ and $R_3$ combined is at least 4.

21. The method of claim 1 wherein the weight average molecular weight of said synthetic polymer is at least about 200,000.

22. The method of claim 14 wherein the weight average molecular weight of said synthetic polymer is at least about 200,000.

23. The method of claim 17 wherein the weight average molecular weight of said synthetic polymer is at least about 200,000.

24. The method of claim 18 wherein the weight average molecular weight of said synthetic polymer is at least about 200,000.

* * * * *